(12) United States Patent
Calla et al.

(10) Patent No.: US 8,261,444 B2
(45) Date of Patent: Sep. 11, 2012

(54) TURBINE ROTOR FABRICATION USING COLD SPRAYING

(75) Inventors: Eklavya Calla, Rajasthan (IN);
Surinder Pabla, Greer, SC (US);
Raymond Goetze, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/574,943

(22) Filed: Oct. 7, 2009

(65) Prior Publication Data
US 2011/0078896 A1    Apr. 7, 2011

(51) Int. Cl.
B23P 6/00 (2006.01)

(52) U.S. Cl. ..... 29/889.2; 29/889.23; 29/889; 29/527.1; 427/191; 427/192

(58) Field of Classification Search .......... 29/889.2, 29/889.21, 889.23, 889.3, 527.1, 527.3; 427/190, 427/191, 192, 180
See application file for complete search history.

(56) References Cited

U.S. PATENT DOCUMENTS

| | | | |
|---|---|---|---|
| 5,302,414 A | | 4/1994 | Alkhimov et al. |
| 6,444,259 B1 * | | 9/2002 | Subramanian et al. ....... 427/191 |
| 6,499,946 B1 * | | 12/2002 | Yamada et al. ............ 415/199.4 |
| 6,905,728 B1 | | 6/2005 | Hu et al. |
| 6,971,850 B2 | | 12/2005 | Ganesh et al. |
| 7,065,872 B2 * | | 6/2006 | Ganesh et al. ................ 29/889.2 |
| 7,546,685 B2 | | 6/2009 | Ganesh et al. |
| 2005/0118330 A1 | | 6/2005 | Clark et al. |
| 2006/0093512 A1 | | 5/2006 | Pandey |
| 2006/0166020 A1 * | | 7/2006 | Raybould et al. ............. 428/471 |
| 2006/0207094 A1 | | 9/2006 | Allen et al. |
| 2006/0260126 A1 | | 11/2006 | Groh et al. |
| 2006/0269437 A1 | | 11/2006 | Pandey |

FOREIGN PATENT DOCUMENTS

| | | |
|---|---|---|
| EP | 1903127 A1 | 3/2008 |
| EP | 2206804 A1 | 7/2010 |

OTHER PUBLICATIONS

"DoD Maintenance Depot Capabilities and Services", Depot Maintenance Public-Private Partnerships, Aug. 28, 2003, 38 pages.
WTEC Panel Report on Additive/Subtractive Manufacturing Research and Development in Europe; pp. i-viii and "Manufacturing Advances, Applications, and Challenges", Chapter 3, Dec. 4, 2004, pp. 25-33.
Irissou et al., "Review on Cold Spray Process and Technology: Part I—Intellectual Property", SpringerLink—Abstract of Journal Article, http://www.springerlink.com/content/h704237421282646/, Oct. 8, 2008, 3 pages.
Joseph J. Beaman et al., "Additive/Subtractive Manufacturing Research and Development in Europe, Final Report", Work Technology Evaluation Center, Inc. (WTEC), Dec. 2004, 20 pages, Baltimore, Maryland.
GB Search Report issued in connection with corresponding GB Application No. GB1016721.1 on Jan. 27, 2011.

* cited by examiner

*Primary Examiner* — David Bryant
*Assistant Examiner* — Christopher Besler
(74) *Attorney, Agent, or Firm* — Nixon & Vanderhye, P.C.

(57) ABSTRACT

A method of manufacturing a rotor includes: (a) providing a core shaft; (b) cold spraying alloy powder particles onto the core shaft; (c) controlling the cold spraying to form sections at least of different shape along the core shaft to thereby form a near-net shape rotor; and (d) heat treating the near-net shape rotor to relieve stresses and to form diffusion bonding across interfaces between individual powder particles and the core shaft, and finish-shaping said near-net shape rotor.

16 Claims, 3 Drawing Sheets

TURBINE ROTOR FABRICATION USING COLD SPRAYING

BACKGROUND OF THE INVENTION

This invention relates to the manufacture of turbine components and more specifically, to the manufacture of a turbine rotor by a cold spraying process.

Rotors used in the steam turbines, gas turbines and jet engines typically experience a range of operating conditions along their lengths. Different operating conditions complicate the selection of both rotor materials and manufacturing processes for the rotor because materials optimized to satisfy one operating condition may not be optimal for meeting another operating condition. For example, the inlet and exhaust areas of a steam turbine rotor have different material property requirements. The high temperature inlet region typically requires a material with high creep rupture strength but only moderate toughness. The exhaust area, on the other hand, does not demand the same level of high temperature creep strength but suitable materials typically must have very high toughness because of the high loads imposed by long turbine blades used in the exhaust area. Monolithic rotors of a single chemistry cannot meet the property requirements in each of the low pressure, intermediate pressure, and high pressure stages for reasons noted above.

As a result, rotors are often constructed by assembling segments of different chemistries. For example, large steam turbines typically have a bolted construction made up of separate rotors contained in separate shells or hoods for use in different sections of the turbine. Smaller steam turbines may make use of a mid span coupling to both high and low pressure temperature components together in one shell. Rotors for gas turbines and jet engines, on the other hand, are often constructed by bolting a series of disks and shafts together. While rotors having bolted construction are widely used, they suffer from several disadvantages including increased numbers of parts, increased assembly requirements, increased length of the rotor assembly and increased balance complexity.

Another method of combining different materials in the single rotor is to weld together rotor segments formed of dissimilar materials forming what may be termed a multiple alloy rotor. However, a welded rotor construction also has disadvantages such as high investment costs for the welding equipment, additional production costs for weld preparation and welding, and long production times required to inspect and upgrade the weld and the need for post weld heat treatment. The strength of rotors having a welded construction can also be limited due to a need to maintain a low carbon content in the weld and the propensity for high numbers of small non-metallic inclusions that reduce load carrying capability.

There remains a need therefore, for providing a novel way of manufacturing a turbine rotor that will reduce material wastage, permit dissimilar materials to be incorporated into the rotor construction and reduce production time and costs associated with the manufacture of the rotor.

BRIEF DESCRIPTION OF THE INVENTION

In accordance with an exemplary but nonlimiting embodiment of the invention, either the entire rotor or some parts of the rotor are manufactured by a cold spraying process. Cold spraying is a technique in which dense and well-adhered deposits are formed due to the high velocity impact of powdered feedstock on a substrate. The deposits formed do not undergo phase transformation or oxidation during flight. Moreover, due to high velocity impact, the powder particles undergo high strain at very high strain rates. This leads to grain refinement and a very fine-grained structure in the deposited material. The grain refinement also leads to the formation of nanno-grain structure having a higher strength than materials formed by conventional methods.

Accordingly, in one aspect, the present invention relates to a method of producing a turbine rotor comprising (a) providing a core shaft; (b) cold spraying alloy powder particles onto the core shaft; (c) controlling the cold spraying to form sections of different shape along the core shaft to thereby form a near-net shape rotor; and (d) treating the near-net shape rotor to relieve stresses and to form diffusion bonding across interfaces between individual powder particles and the core shaft.

In another aspect, the invention relates to a method of a method of repairing a damaged rotor comprising (a) preparing a locally damaged portion of the rotor; (b) cold spraying alloy powder particles onto the locally damaged portion; (c) controlling the cold spraying in step (b) to restore the locally damaged portion to form a repaired portion having substantially the same properties and shape as originally manufactured; and (d) heat treating at least the repaired portion.

In still another aspect, the invention relates to a method of manufacturing a rotor comprising: (a) providing a core shaft; (b) cold spraying alloy powder particles onto the core shaft; (c) controlling the cold spraying to form core shaft sections of different shape along a length dimension of the core shaft; (d) cold spraying to form one or more rotor discs adapted for assembly on the core shaft; (e) fixing the one or more rotor disks on the rotor to form a near-net shape rotor; (f) treating said near-net shape rotor to relieve stresses and to form diffusion bonding across interfaces between individual powder particles and the core shaft; and (g) finish-shaping the near-net shape rotor.

DETAILED DESCRIPTION OF THE INVENTION

Figure 1:
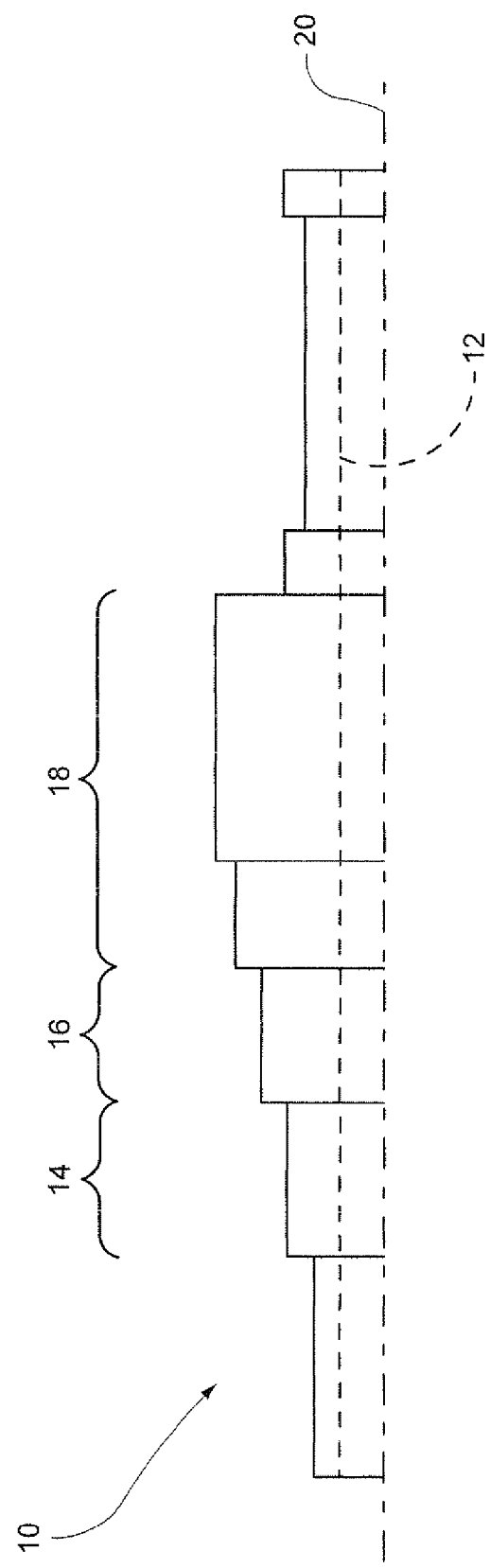
FIG. 1 schematically shows a partially-formed rotor manufactured in accordance with a first exemplary but nonlimiting embodiment of the invention.

FIG. 1 shows a partially-formed rotor 10, cold sprayed on a core shaft or mandrel 12. The rotor 10 is shown with built-up portions defining high pressure (HP), intermediate pressure (IP) and low pressure (LP) sections 14, 16, 18, respectively, along a geometric centerline or axis of rotation 20, using a cold-spray process described in further detail below.

Figure 2:
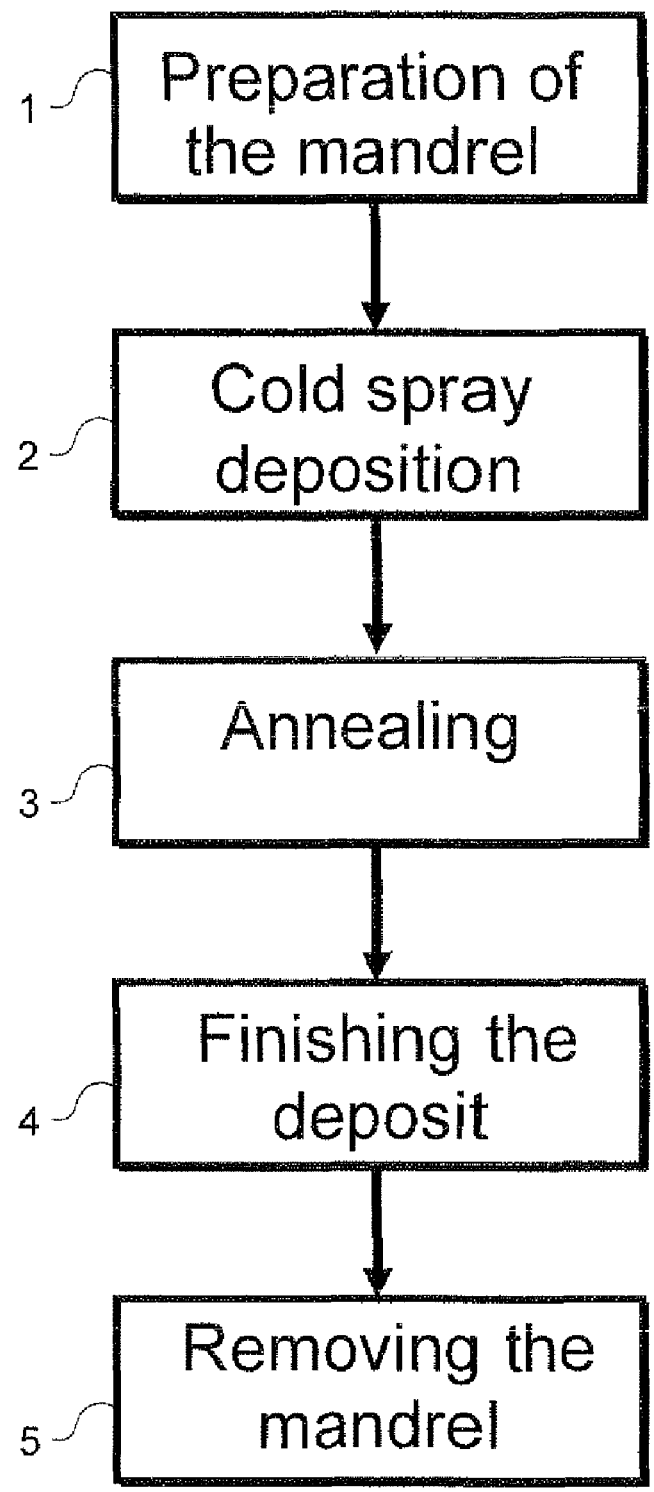
FIG. 2 is a flow diagram illustrating a rotor manufacturing process in accordance with a first exemplary but nonlimiting embodiment of the invention.

With reference to the process chart shown in FIG. 2, in a first exemplary but non-limiting embodiment of the invention, the entire rotor 10 is manufactured using primarily an otherwise known cold spraying process. The first step 1 involves preparation of the core shaft or mandrel 12. Specifically, the core shaft or mandrel 12 is cleaned, surface finished and machined to the required profile and shape. For consistency of terminology, a "core shaft" is referred to below in terms of an embodiment where the core shaft remains part of the finished rotor. The core shaft may also be provided, however, in the form of a removable a "mandrel" which is removed during or after completion of the rotor manufacture as described further herein.

Step 2 in the first exemplary but nonlimiting embodiment involves the cold spray deposition onto the core shaft 12 to form a near-net shape rotor. One or more cold spray gun/nozzles mounted on one or more robots, CNC or other suitable automated machines are used to build up the rotor 10 to a near net shape shown in FIG. 1. The standoff distance while spraying is usually between 10 mm to 100 mm. The spray gun/nozzle may be designed to spray on large areas, for e.g. by having large area of exit in the nozzle. It is also possible to use more than one gun simultaneously to achieve faster spraying speeds or to accommodate needs for spraying at different rates or spraying different materials. The guns are usually mounted on a traversing means of the type mentioned above and the traversing means can be programmed to achieve (by spraying) specific profiles that might be required in different parts of the rotor. Automated machines of this type are generally known in the art and need not be described in detail.

Powder material of a selected composition is sprayed onto the core shaft 12 to build up the rotor and to form the various thicknesses in the sections 14, 16 and 18 and, optionally, the wheels or disks (not shown) that support the turbine buckets or blades. In this regard, the one or more spray guns enable the fabrication of complex shapes using different materials in different areas along the length of the rotor, with changes in the powder material composition and thickness implemented during the spraying process as dictated by the machine control program. For example, while forming the required rotor features in the compressor section of the machine, NiCrMoV powder may be used for applications up to 650 F, while CrMoV powder may be used for applications up to 810 F. In addition, in a transition region between the compressor section of the rotor and the turbine section of the rotor with temperatures up to 1100 F, a graded mixture of CrMoV and a Ni-based alloy having the following nominal composition in percent may be used:

| | |
|---|---|
| Ni | 52.50 |
| Co | 1.00 |
| Cr | 19.00 |
| Mo | 3.05 |
| Fe | 17.00 |
| Si | 0.35 |
| Mn | 0.35 |
| C | 0.080 |
| Al | 0.600 |
| Ti | 0.900 |
| Cu | 0.30 |
| P | 0.015 |
| B | 0.006 |
| S | 0.015 |
| Cb + Ta | 5.125 |

One such alloy is available under the name IN 718®. In other words, the deposits in the transition region can start with higher amounts of CrMoV, with gradually increasing amounts of, for example, IN 718® content to achieve a smooth transition to pure IN 718® at the turbine side of the rotor. Alternatively, another Ni-based allow may be used in the turbine section up to 1100 F, for example, an alloy having the following composition in percent:

| | |
|---|---|
| Nickel | 55.0-59.0 |
| Chromium | 19.0-22.5 |
| Molybdenum | 7.0-9.5 |
| Niobium | 2.75-4.0 |
| Titanium | 1.0-1.7 |
| Aluminum | 0.35 max |
| Carbon | 0.03 max |
| Manganese | 0.35 max |
| Silicon | 0.20 max |
| Phosphorus | 0.015 max |
| Sulfur | 0.010 max |
| Iron | Balance |

One such alloy is available under the name IN-725®, formed by powder metallurgy process. Still another Ni-based alloy may be used (up to 905 F) in, for example, the turbine rotor aft shaft. This third alloy may have the following composition in percent:

| | |
|---|---|
| Carbon | 0.06 |
| Manganese | 0.35 |
| Silicon | 0.35 |
| Phosphorus | 0.020 |
| Sulfur | 0.015 |
| Nickel + Cobalt | 44.0 |
| Chromium | 17.5 |
| Cobalt | 1.00 |
| Iron | Balance |
| Aluminum | 0.40 |
| Titanium | 2.00 |
| Boron | 0.006 |
| Copper | 0.30 |
| Cb + Ta | 3.30 |

One such alloy is available under the name IN-706®.

Similar joints also exist in the compressor and turbine rotor sections where transitions between different stages and/or sections (HP, IP and LP) are associated with changes in temperature profiles. Material changes may also be required during cold spraying of the rotor discs or wheels (within the same or different disks).

The material composition transitions can be achieved by varying the powder composition in a single powder feeder, or different powder compositions can be fed from multiple feeders in the required ratios. In other words, the ability of the cold spraying process to form graded coatings can be exploited to provide a gradual transition in the alloy composition wherever needed to, for example, reduce the stresses due to mismatch of coefficients of thermal expansion or to meet other material property requirements.

During the implementation of step 2, various cold spray parameters will depend upon the gun design (for example, the ratio of the area of nozzle exit to the nozzle throat). The equation given below describes the flow in a converging/diverging nozzle that is operating in the choked condition:

$$\frac{A}{A^*} = \frac{1}{M}\left[\frac{2}{\gamma+1}\right]\left[1 + \left(\frac{\gamma-1}{2}\right)M^2\right]^{\frac{\gamma+1}{2(\gamma-1)}}$$

where A is the area of nozzle exit and A* is the area of nozzle throat, and Gamma ($\gamma$) is the adiabatic index or heat capacity ratio Op (heat capacity at constant pressure)/Cv (heat capacity at constant volume) of the process gas being used.

The gas flow parameters will depend upon the ratio, A/A*. A certain minimum gas mass flow is necessary to operate the nozzle in the choked condition. Once the nozzle is operating in the choked condition, the exit gas velocity will be the Mach number (M) predicted by the equation above. Gas having a higher gamma value is beneficial as it results in a higher Mach number. Increasing the gas mass flow further, however, does not per se increase the gas exit velocity but it makes the gas in the nozzle denser. The denser gas exerts more drag force on the feedstock particles and thus accelerates them to a higher degree. Thus, the effect of increasing the gas mass flow in this case is to increase the particle velocity. Higher particle velocities are generally good in cold spraying particularly since the particles have to be traveling above a certain minimum critical velocity to form the coating. Increasing the gas pressure increases the gas mass flow, noting however, that some cold spray systems are equipped with mass flow controllers and in those systems the gas mass flow can be directly increased.

The role of temperature in increasing the gas velocity is somewhat indirect. As can be seen from the above equation, the gas temperature is not related to the exit Mach number; however, hotter gases have a higher value for the Mach number (i.e. the speed of sound is higher in hotter gases), and this influences the exit gas velocity, as hotter gas will be traveling at a higher velocity.

With these general cold spray parameters in mind, it will be appreciated that the specific cold spray parameters utilized in any given turbine rotor cold spraying manufacturing process may vary as necessary to produce the desired results. In other words, these general parameters provide an understanding on how to adjust the specific spray parameters like gas flow, pressure and temperature, nozzle design, stand-off distance between the nozzle exit and the substrate etc.

The cold spraying process is advantageous in that it consumes less time and is easier to control than conventional manufacturing techniques. In addition, cold spraying forming is an additive process that is more efficient than a typical material removal process (e.g. forging and then machining).

Step 3 in the process involves treating by annealing, for example, the deposited material to stress relieve the material and to achieve the desired microstructure.

Step 4 involves converting the near-net shape produced in step 2 to the final form or shape (i.e. finish-shaping), with the desired surface finish, thicknesses and profiles. This can be achieved by conventional means such as forging, machining, grinding and the like, or combinations thereof.

Hot Isostatic Pressing (HIP) may also be carried out if required. HIP is useful to reduce porosity even further, and to improve the mechanical properties. HIP may be used, if required, either after step 3 or after step 4.

Step 5 applies only in those applications where a removable mandrel 12 is employed. This circumstance affects the choice of material for the mandrel. For example, the mandrel can be made of aluminum which may be removed by a dissolving in a caustic solution. Alternatively, some mandrels may be removed by machining. Other mandrel material choices include non-metals such as plastics, rubbers or wax which may be removed by heating the rotor after forming per steps 1-4 or may simply be pushed out.

As an alternative to the "disposable" mandrels discussed above, permanent reusable mandrels can be employed in the process as well. These mandrels are made removable by, for example, applying a release agent on the mandrel prior to cold spraying. Release agents, such as boron nitride, are widely used in forging and casting. The release agent is applied as a thin film on the mandrel and prevents adhesion of the cold spray material. A thin layer of low-melting material can also serve as a release agent in that the material can be melted away after the cold spraying is completed, thereby allowing the mandrel to be removed.

In still another technique for rendering a mandrel removable, the cold spray parameters may be adjusted to produce loosely adhering particles near the mandrel surface (e.g., by using lower gas mass flow rates and temperature to produce a deposit from low velocity impacts that will not adhere well to the mandrel).

The advantage of using a mandrel 12 is that internal designs desired on the rotor itself can be incorporated into the mandrel as external features. For example, if a cooling channel is desired on the rotor, then it can be included on the mandrel as a protrusion and the subsequent spray forming on the protrusion will result in a channel being formed. By using complex mandrel designs, complex internal features (for e.g. cooling channels) can be included in the rotor.

In another exemplary but nonlimiting embodiment, the rotor disks could be cold-spray formed generally as described above, and then fixed onto the cold-sprayed rotor 10. ("Fixing" may require a joining spray or a weld operation at the interface to join the disks to the rotor). Thus, either one or both of the rotor and the rotor disks may be formed by cold spraying.

Figure 3:
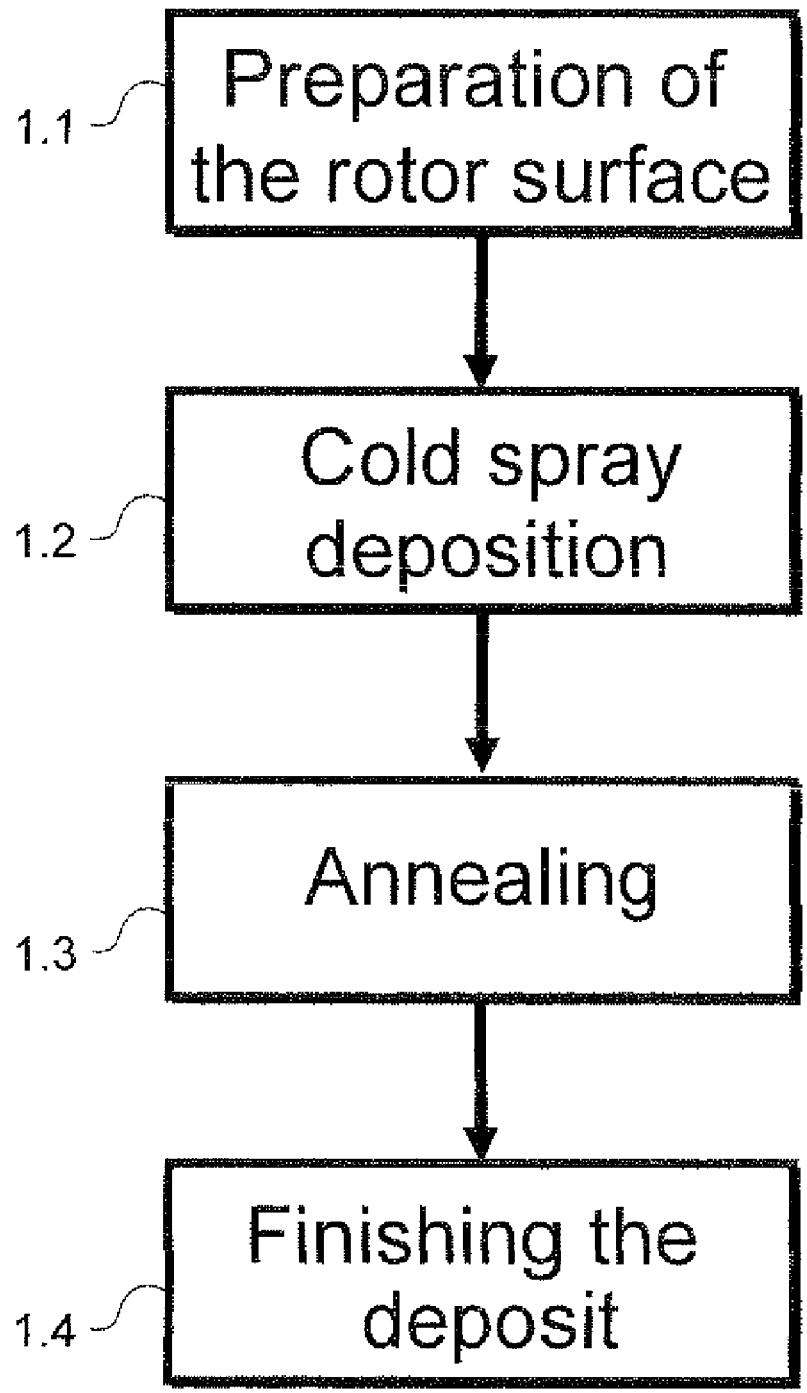
FIG. 3 is a flow diagram of a rotor repair process in accordance with a second exemplary but nonlimiting embodiment of the invention.

With reference now to FIG. 3, a repair application of the cold spraying process is shown. Thus, in a first step 1.1, only the locally damaged rotor surface need be cleaned, preferably in the same manner as step 1 of the first-described rotor manufacturing process. Additionally, the damaged area needs to be suitably opened to permit a spraying operation to be performed on it. Steps 1.2, 1.3 and 1.4 are carried out in substantially the same manner as steps 2-4 of the earlier described process. In other words, except for the local nature of the repair process (requiring, for example, only the prepared, locally-damaged portion of the rotor to be cold sprayed and then annealed to restore the locally-damaged portion to a repaired portion having substantially the same properties and substantially the same shape as the originally manufactured rotor), the process steps and process parameters are substantially as discussed above in connection with the rotor manufacturing process. It will be appreciated that depending on the location of the damaged portion of the rotor, the composition of the alloy powder may vary in axial and/or radial directions during the cold spraying operation. For example, powder material composition variance may be required for damaged areas located at the interface between the rotor shaft and a wheel or disk.

In still another exemplary but non-limiting embodiment, cold spraying may be employed to apply a track or strip of material such as NiCr to facilitate the attachment of instrument leads to the rotor. Currently, instrumentation leads are tack-welded to HVOF or air-plasma-sprayed materials on the rotor. The materials typically sprayed onto the rotor are Ni-, Co- or Fe-based alloys. The purpose of the coating is to provide a layer on the rotor such that the tack-weld bead does not penetrate into the rotor material. Porosity and oxides in the tracks are the key causes of failure of the tracks. The lower oxides, lower porosity and better adherence features of cold-sprayed tracks will help improve the life of the tracks. The denser track will also prevent penetration of the tack weld into the rotor substrate. This is a key performance requirement that may not be met by HVOF and plasma-sprayed tracks. Thus, any soldering, brazing or welding operation carried out on the cold-sprayed tracks will have better integrity as compared to HVOF or air plasma-sprayed tracks.

The benefit in using cold spraying is also reflected in the reduction of masking requirement as compared to HVOF or plasma spray.

Another method of applying the instrumentation leads would be to cold-spray a coating directly on the leads that are placed on the rotor, thus attaching the leads to the rotor surface. The thickness and width of the coating will depend upon the centrifugal forces acting on the leads in use. Since a cold-sprayed coating promotes stronger bonding to the substrate, it is more capable of bonding the leads to the rotor. A conventional annealing step may be required to improve the diffusion bond between the cold-sprayed track and the rotor surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. This process may also be used to fabricate other metallic/alloy parts for various applications.

What is claimed is:

1. Method of manufacturing a turbine rotor including at least compressor and turbine sections of the turbine rotor comprising:
   (a) providing a core shaft;
   (b) utilizing one or more spray nozzles located at a distance of between 10 mm and 100 mm from said core shaft and cold spraying alloy powder particles onto said core shaft;
   (c) controlling the cold spraying to build up and form said compressor and turbine sections of the turbine rotor of different shapes and thicknesses along the core shaft to thereby form a near-net shape rotor wherein alloy powder particles of different compositions are used to form said compressor and turbine sections; and
   (d) treating said near-net shape rotor to relieve stresses and to form diffusion bonding across interfaces between individual powder particles and the core shaft.

2. The method of claim 1 wherein said core shaft remains an integral part of said turbine rotor.

3. The method of claim 1 and further comprising:
   (e) finish-shaping said near-net shape rotor by any one of forging, machining, grinding or combinations thereof.

4. The method of claim 1 wherein step (c) is carried out to form one or more disks on said core shaft.

5. The method of claim 4 wherein a composition of said alloy powder articles is varied along a radial direction of the one or more disks.

6. The method of claim 1 wherein said material composition includes a chromium-based alloy in said compressor section of the rotor and a nickel-based alloy in said turbine section of the rotor.

7. The method of claim 3 wherein the core shaft is comprised of a material selected from a group comprising metals, plastics and rubbers.

8. The method of claim 1 said core shaft is in the form of a removable mandrel that is removed after step (e).

9. The method of claim 8 wherein said removable mandrel is composed of a material selected from a group comprising metals, plastics and rubbers.

10. The method of claim 3 and further comprising hot isostatic pressing after step (d) or after step (e).

11. A method of manufacturing a turbine rotor including at least compressor and turbine sections comprising:
    (a) providing a core shaft;
    (b) utilizing one or more spray nozzles located at a distance of between 10 mm and 100 mm from said core shaft and cold spraying alloy powder particles onto said core shaft;
    (c) controlling the cold spraying to build up and form said compressor and turbine sections of said turbine rotor of different shapes, thicknesses and compositions along a length dimension of the core shaft;
    (d) cold spraying to form one or more rotor discs adapted for assembly on said core shaft;
    (e) fixing said one or more rotor disks on said rotor to form a near-net shape rotor;
    (f) heat treating said near-net shape rotor to relieve stresses and to form diffusion bonding across interfaces between individual powder particles and the core shaft; and
    (g) finish-shaping said near-net shape rotor.

12. The method of claim 11 wherein said composition includes a chromium-based alloy in said compressor section of the turbine rotor and a nickel-based alloy in said turbine section of the turbine rotor.

13. The method of claim 11 wherein said core shaft remains an integral part of said turbine rotor.

14. The method of claim 11 wherein said core shaft is in the form of a removable mandrel, removed after step (g).

15. The method of claim 11 wherein a composition of said alloy powder articles is varied along a radial direction of the one or more disks.

16. The method of claim 11 wherein step (g) is carried out by any one of forging, machining, grinding or combinations thereof.

* * * * *

UNITED STATES PATENT AND TRADEMARK OFFICE
CERTIFICATE OF CORRECTION

PATENT NO. : 8,261,444 B2  Page 1 of 1
APPLICATION NO. : 12/574943
DATED : September 11, 2012
INVENTOR(S) : Eklavya Calla et al.

It is certified that error appears in the above-identified patent and that said Letters Patent is hereby corrected as shown below:

At column 4, line 63, delete "Op" and insert --Cp--

Signed and Sealed this
Eleventh Day of December, 2012

David J. Kappos
*Director of the United States Patent and Trademark Office*